(12) United States Patent
Kim

(10) Patent No.: US 9,079,578 B2
(45) Date of Patent: Jul. 14, 2015

(54) APPARATUS AND METHOD FOR CONTROLLING TRANSMISSION CUT-OFF OF HEAVY CONSTRUCTION EQUIPMENT

(75) Inventor: Sung Il Kim, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/996,718

(22) PCT Filed: Dec. 21, 2011

(86) PCT No.: PCT/KR2011/009930
§ 371 (c)(1),
(2), (4) Date: Jun. 21, 2013

(87) PCT Pub. No.: WO2012/087023
PCT Pub. Date: Jun. 28, 2012

(65) Prior Publication Data
US 2013/0268167 A1    Oct. 10, 2013

(30) Foreign Application Priority Data
Dec. 21, 2010  (KR) .................. 10-2010-0131082

(51) Int. Cl.
G06F 17/00 (2006.01)
B66C 23/00 (2006.01)
B60W 10/10 (2012.01)
E02F 9/20 (2006.01)
B60W 10/02 (2006.01)
E02F 9/26 (2006.01)

(52) U.S. Cl.
CPC .............. *B60W 10/10* (2013.01); *B60W 10/02* (2013.01); *E02F 9/2079* (2013.01); *E02F 9/265* (2013.01)

(58) Field of Classification Search
USPC ................ 701/50, 51, 53, 55, 56, 61, 87, 95; 414/699, 815, 700; 74/354, 353
See application file for complete search history.

(56) References Cited

U.S. PATENT DOCUMENTS

2006/0125317 A1* 6/2006 Kokubo et al. ............... 303/152
2012/0003070 A1* 1/2012 Tochizawa et al. ........... 414/685

FOREIGN PATENT DOCUMENTS

JP          63071534   *  3/1988
JP       2005-090217 A    4/2005
(Continued)

OTHER PUBLICATIONS

Search Report dated Jul. 30, 2012 and written in Korean with English translation attached for International Patent Application No. PCT/KR2011/009930 filed Dec. 21, 2011, 5 pages.

Primary Examiner — Muhammad Shafi
(74) Attorney, Agent, or Firm — John D. Veldhuis-Kroeze; Westman, Champlin & Koehler, P.A.

(57) ABSTRACT

An apparatus for controlling transmission cut-off of heavy construction equipment according to the present disclosure includes: a displacement sensor which detects a boom height; a vehicle control unit (VCU) to which a detected signal of the displacement sensor is input; a transmission control unit (TCU) which is connected with the vehicle control unit and controls a transmission clutch cut-off function; a driving control proportion valve block (transmission valve assembly) which is connected with the transmission control unit and performs a driving control; and a brake press sensor which is connected with the transmission control unit and detects a brake pedal pressure.

6 Claims, 2 Drawing Sheets

(56) References Cited

FOREIGN PATENT DOCUMENTS

| KR | 10-1995-0029482 A | 11/1995 |
| KR | 1999-0013076 | * 4/1999 |
| KR | 10-2006-0063442 A | 6/2006 |
| KR | 10-2009-0117262 A | 11/2009 |
| WO | WO-2010-107000 | * 9/2010 |

* cited by examiner

APPARATUS AND METHOD FOR CONTROLLING TRANSMISSION CUT-OFF OF HEAVY CONSTRUCTION EQUIPMENT

CROSS-REFERENCE TO RELATED APPLICATION

This application is a Section 371 National Stage application of International Application No. PCT/KR2011/009930, filed Dec. 21, 2011 and published, not in English, as WO2012/087023 on Jun. 28, 2012.

FIELD OF THE DISCLOSURE

The present disclosure relates to an apparatus and a method of controlling transmission cut-off of heavy construction equipment, and more particularly, to an automatic release of a clutch cut-off function when a boom height detected by a displacement sensor is equal to or larger than, or is not within a predetermined height.

BACKGROUND OF THE DISCLOSURE

In general, heavy construction equipment, such as a wheel loader, performs an operation of booming working substances, such as sand or gravel, and putting the working substances into a bucket while driving, an operation of transporting working substances to another place, and a loading operation of dumping working substances on a dump truck.

The heavy construction equipment, such as the wheel loader, has a clutch cut-off function of automatically enabling a transmission to be in a neutral condition based on a brake pedal operation and an output of an engine, and the like. The clutch cut-off function refers to a function of automatically switching a condition of the transmission to a neutral condition and maintaining the neutral condition of the transmission in order to cut off power consumed by driving-side components, and secure power required for an operation in a case where a front operation device, such as a boom, is used in an idle state. Even though the clutch cut-off function is operated, in a case where the brake is released and an accelerator pedal is operated for driving, driving and braking are available through a connection with the transmission.

Accordingly, in a case where a driver needs to frequently brake or maintain a stop state because there are many operations using the front operation device, it is advantageous to automatically make the transmission be in the neutral condition according to a situation by activating the clutch cut-off function by operating a clutch cut-off switch. Contrary to this, in a case where driving needs to be mainly performed, it is advantageous to turn off the clutch cut-off function by operating the clutch cut-off switch.

According to the transmission cut-off control apparatus of the heavy construction equipment in the related art, in a case where working substances are excavated and dumped into a vehicle, an excavation operation is available with sufficient power by cutting off power consumed for transmission power as necessary by operating the clutch cut-off function and combining the cut-off power with front power.

However, in a case where freight is transported for loading into a dump truck, and the like in this state, when a brake pedal is operated at a time where driving is completed, the transmission is in the neutral condition, so that the driving is abruptly stopped. Especially, the aforementioned driving is performed in a state where the bucket including the freight is raised high, such that the stop of the driving has a problem in that considerable impact is caused by the abrupt stop of the driving of the vehicle, which may cause the freight to fall.

Further, even in a series of operation processes of excavating and loading the freight with the heavy construction equipment, in order to operate or stop the clutch cut-off function, there is a problem in that the driver needs to repeat a clutch cut-off switch on/off operation.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been contrived in consideration of the aforementioned problems in the related art, and an object of the present disclosure is to provide an apparatus and a method of controlling transmission cut-off of heavy construction equipment which are capable of automatically switching a clutch cut-off function according to an operation type, thereby improving workability and productivity, and promoting a driver's convenience.

In order to achieve the above object, an apparatus for controlling transmission cut-off of heavy construction equipment according to the present disclosure includes: a displacement sensor which detects a boom height; a vehicle control unit (VCU) to which a detected signal of the displacement sensor is input; a transmission control unit (TCU) which is connected with the vehicle control unit and controls a transmission clutch cut-off function; a driving control proportion valve block (transmission valve assembly) which is connected with the transmission control unit and performs a driving control; and a brake press sensor, which is connected with the transmission control unit and detects a brake pedal pressure.

The apparatus for controlling transmission cut-off of the heavy construction equipment according to the present disclosure may further include a clutch cut-off switch which operates transmission clutch cut-off, and an angle sensor may be used as the displacement sensor.

In the meantime, a method of controlling transmission cut-off of heavy construction equipment of the present disclosure includes: detecting a boom height by a displacement sensor; determining whether a boom height detected by a displacement sensor is equal to or larger than a predetermined height, by a vehicle control unit; and as a result of the determination of the vehicle control unit, when the boom height is equal to or larger than the predetermined height, operating the clutch cut-off function, and when the boom height is smaller than the predetermined height, stopping the clutch cut-off function, by the transmission control unit.

Further, a method of controlling transmission cut-off of heavy construction equipment according to the present disclosure includes: detecting a boom height by a displacement sensor; determining whether the boom height detected by the displacement sensor is not within a predetermined height, by a vehicle control unit; and as a result of the determination of the vehicle control unit, when the boom height is not within the predetermined height, operating a clutch cut-off function by a transmission control unit, and when the boom height is within the predetermined height, stopping the clutch cut-off function by the transmission control unit.

According to the apparatus and the method of controlling transmission cut-off of the heavy construction equipment according to the present disclosure, it is possible to perform an operation with sufficient power by concentrating transmission power to a front operation during a freight excavation operation or a dumping operation process performed in a stop state in which a boom height is small, and it is possible to prevent the freight from falling due to a generation of impact to a vehicle by automatically turning off the clutch cut-off function even though a driver turns on the clutch cut-off switch in a case where a driving is performed in a state where the boom height is large. Accordingly, it is possible to improve workability and increase driver's convenience, and it is possible to decrease a work time taken for excavation, dump, and loading operations of the heavy construction equipment, thereby achieving an effect of considerably improving productivity.

DESCRIPTION OF MAIN REFERENCE NUMERALS OF DRAWINGS

Figure 1:
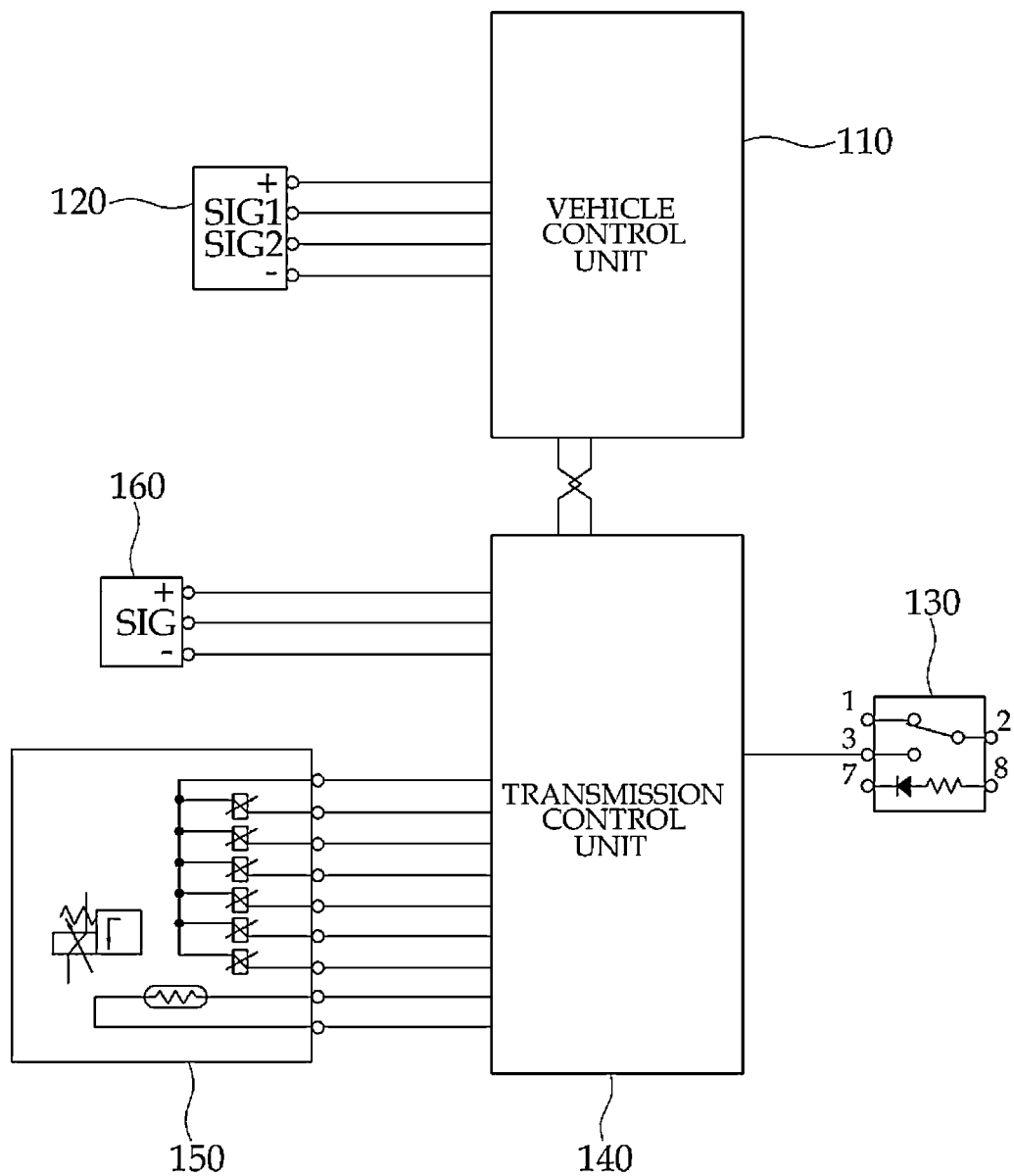
FIG. 1 is a configuration circuit diagram of an exemplary embodiment of the present disclosure.

110: Vehicle control unit
120: Displacement sensor
130: Clutch cut-off switch
140: Transmission control unit
150: Driving control proportion valve block
160: Brake press sensor

DETAILED DESCRIPTION

Hereinafter, detailed technical contents of the present disclosure for achieving the objects will be described in detail with reference to the accompanying drawings.

FIG. 1 illustrates a configuration circuit diagram of an exemplary embodiment of the present disclosure.

As illustrated in FIG. 1, a transmission cut-off control apparatus of heavy construction equipment of the present disclosure includes: a displacement sensor 120 for detecting a boom height; a vehicle control unit (VCU) 110 to which a detected signal of the displacement sensor 120 is input; a transmission control unit (TCU) 140, which is connected to the vehicle control unit 110 and which controls a transmission clutch cut-off function; a driving control proportion valve block (transmission valve assembly) 150 which is connected with the transmission control unit 140 and performs a driving control; and a brake pressures sensor 160 which is connected with the transmission control unit 140 and detects a pressure of a brake pedal.

Further, the transmission cut-off control apparatus of the heavy construction equipment according to the present disclosure may further include a clutch cut-off switch 130 which is connected with the transmission control unit 140 and operates transmission clutch cut-off as described in the exemplary embodiment of FIG. 1.

Further, an angle sensor may be used as the displacement sensor 120 for detecting the boom height.

Figure 2:
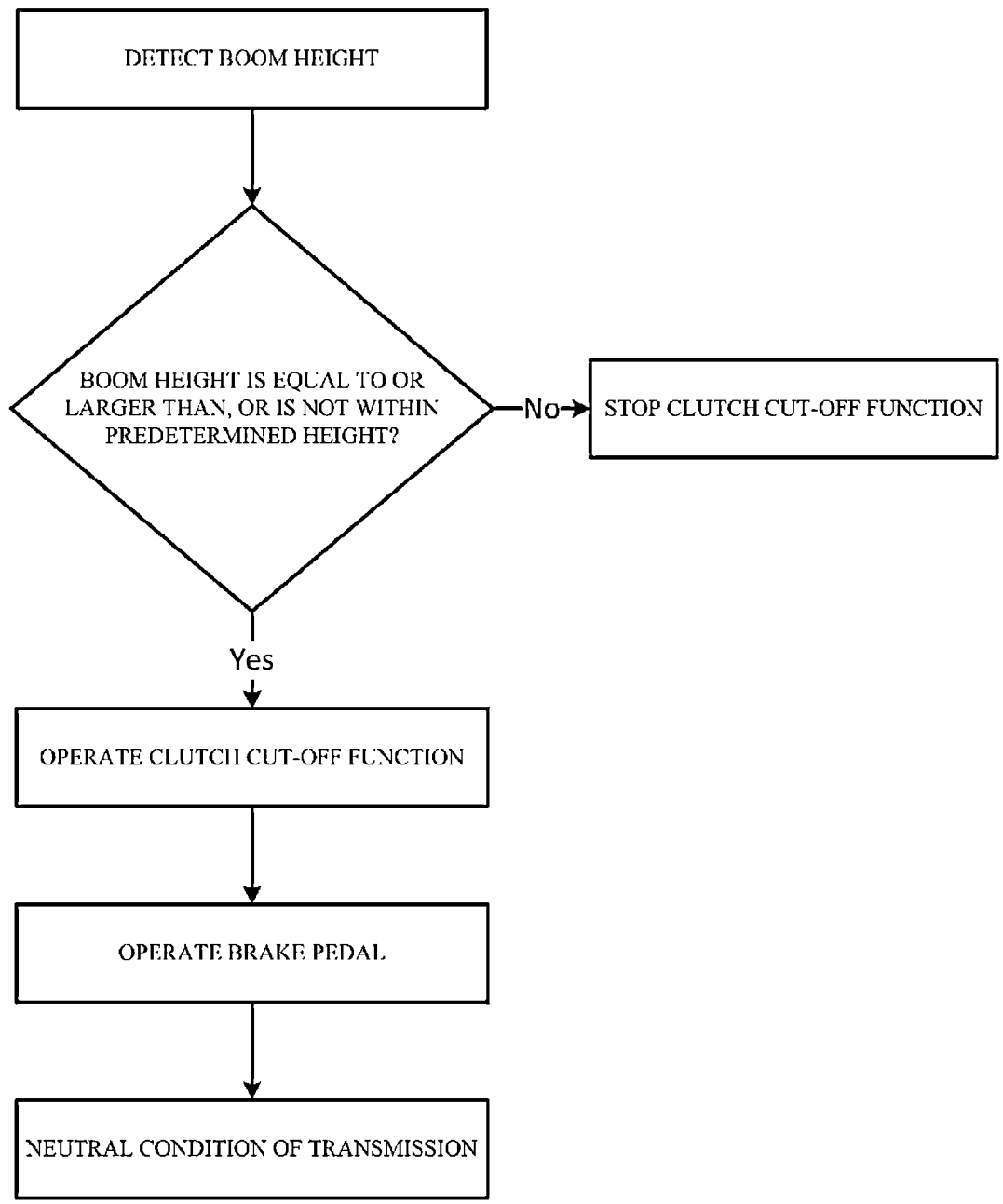
FIG. 2 is a control flowchart of the exemplary embodiment of the present disclosure.

In the meantime, FIG. 2 illustrates a flowchart of the control of the exemplary embodiment of the present disclosure.

In the transmission cut-off control apparatus of the heavy construction equipment according to the present disclosure having the aforementioned configuration, when a driver of the heavy construction equipment desires to select the clutch cut-off function so that the driver turns on the clutch cut-off switch 130, the transmission control unit 140 stands by so that the transmission becomes a neutral condition at ordinary times. In this case, when a series of detected signals (a brake pressure signal and a boom height detected signal) is input, the transmission control unit 140 determines a time at which a condition of the transmission is switched to the neutral condition in response to the detected signals, and controls the proportion control valve block 150 so that the transmission becomes the neutral condition as necessary. Accordingly, transmission power may be concentrated on a front operation by switching the condition of the transmission to the neutral condition. If the driver turns off the clutch cut-off function by operating the clutch cut-off switch 130, the transmission always receives power from the engine.

Here, a representative general operation for making the transmission be in the neutral condition includes stepping a brake pedal with a predetermined amount of pressure and inputting a detected signal of the brake press sensor 160 to the transmission control unit 140. In addition, various engine-related parameters, such as engine torque, may be used as reference signals for the operation.

In the transmission cut-off control apparatus of the heavy construction equipment according to the present disclosure, in a state where the clutch cut-off function is activated, the transmission control unit 140 is controlled so that the clutch cut-off function is turned off when the boom height is equal to or larger than a predetermined height (for example, equal to or larger than 50%) or is not within the predetermined height.

When it is detected by the displacement sensor 120 that the boom height is equal to or larger than the predetermined height (for example, equal to or larger than 50%) or is not within the predetermined height, the vehicle control unit 110 prevents the transmission from being in the neutral condition while operating the brake by stopping the clutch cut-off function even though the transmission cut-off function is activated.

On the contrary, when the boom height detected by the displacement sensor 120 is smaller than the predetermined height (for example, smaller than 50%) or within the predetermined height, and a brake operation detected signal is input in a state where the clutch cut-off function is activated, the vehicle control unit 110 controls the transmission control unit 140 to make the transmission be in the neutral state. When the clutch cut-off function is not selected in this state, the transmission does not become the neutral condition.

According to the transmission cut-off control apparatus of the heavy construction equipment according to the present disclosure, in an operation state of the clutch cut-off function, transmission power is concentrated on a front operation because the clutch cut-off function is normally operated in a freight excavation operation process, or a dumping operation process of loading freight into a dump truck in which the boom height is small, so that it is possible to perform an excavation operation and a dumping operation with sufficient power, and in a loading operation process in which the boom height is large, even though a driver does not turn off the clutch cut-off switch, the transmission does not enter the neutral condition, so that it is possible to prevent the freight from falling due to a generation of impact to the vehicle.

The aforementioned present disclosure is not limited to the aforementioned description, and it will be obvious to a person of ordinary skill in the art that various substitutions, modifications, and changes may be made within the scope of the technical spirit of the present disclosure.

The apparatus and the method of controlling transmission cut-off of the heavy construction equipment according to the present disclosure may be used to automatically execute a clutch cut-off function when a boom height detected by a displacement sensor is equal to or larger than, or is not within a predetermined height.

Although the present disclosure has been described with reference to exemplary and preferred embodiments, workers skilled in the art will recognize that changes may be made in form and detail without departing from the spirit and scope of the disclosure.

The invention claimed is:

1. An apparatus for controlling transmission cut-off of heavy construction equipment, comprising:
   a displacement sensor which detects a boom height;
   a vehicle control unit (VCU) to which a detected signal of the displacement sensor is input;
   a transmission control unit (TCU) which is connected with the vehicle control unit and controls a transmission clutch cut-off function; and
   a brake press sensor which is connected with the transmission control unit and detects a brake pedal pressure,
   wherein the vehicle control unit and the transmission control unit are configured such that when the boom height is equal to or larger than a predetermined height, based upon the boom height a transmission is prevented from being in a neutral condition while a vehicle travels by turning off the clutch cut-off function.

2. The apparatus of claim 1, further comprising:
   a clutch cut-off switch which is connected with the transmission control unit and operates transmission clutch cut-off.

3. The apparatus according to claim 2, wherein the displacement sensor is an angle sensor.

4. The apparatus according to claim 1, wherein the displacement sensor is an angle sensor.

5. A method of controlling transmission cut-off of heavy construction equipment, comprising:
   identifying whether a clutch cut-off function is selected;
   determining whether a boom height detected by a displacement sensor is equal to or larger than a predetermined height; and
   when the boom height is equal to or larger than the predetermined height, turning off the clutch cut-off function based upon the boom height being equal to or larger than the predetermined height, and when the boom height is smaller than the predetermined height, maintaining the clutch cut-off function based upon the boom height being smaller than the predetermined height.

6. A method of controlling transmission cut-off of heavy construction equipment, comprising:
   detecting a boom height by a displacement sensor;
   determining whether the boom height detected by the displacement sensor is not within a predetermined height by a vehicle control unit; and
   as a result of the determination of the vehicle control unit, when the boom height is not within the predetermined height, stopping a clutch cut-off function by a transmission control unit, and when the boom height is within the predetermined height, operating the clutch cut-off function by the transmission control unit.

* * * * *